US012695935B2

(12) United States Patent (10) Patent No.: US 12,695,935 B2
Lee et al. (45) Date of Patent: Jul. 28, 2026

(54) DISPLAY DEVICE

(71) Applicant: LG ELECTRONICS INC., Seoul (KR)

(72) Inventors: Kyungryun Lee, Seoul (KR); Miyeon Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 18/849,755

(22) PCT Filed: Mar. 24, 2022

(86) PCT No.: PCT/KR2022/004173
§ 371 (c)(1),
(2) Date: Sep. 23, 2024

(87) PCT Pub. No.: WO2023/182547
PCT Pub. Date: Sep. 28, 2023

(65) Prior Publication Data
US 2025/0203145 A1 Jun. 19, 2025

(51) Int. Cl.
*H04N 21/422* (2011.01)
*H04N 21/436* (2011.01)
(Continued)

(52) U.S. Cl.
CPC . *H04N 21/42226* (2013.01); *H04N 21/43615* (2013.01); *H04N 21/43635* (2013.01);
(Continued)

(58) Field of Classification Search
CPC ....... H04N 21/42226; H04N 21/43615; H04N 21/43635; H04N 21/44008;
(Continued)

(56) References Cited

U.S. PATENT DOCUMENTS 11,178,455 B1 * 11/2021 Lee .................. H04N 21/43637
2014/0055675 A1 * 2/2014 An .................... H04N 21/42225
348/569
(Continued)

FOREIGN PATENT DOCUMENTS

KR 10-1365614 B1 3/2014
KR 10-2014-0126231 A 10/2014
(Continued)

OTHER PUBLICATIONS

International Search Report (PCT/ISA/210), issued in PCT/KR2022/004173, dated Dec. 22, 2022.

*Primary Examiner* — Yassin Alata
(74) *Attorney, Agent, or Firm* — Birch, Stewart, Kolasch & Birch, LLP

(57) ABSTRACT

A display device according to an embodiment of the present invention may comprise: a display; an external device interface that provides a connection path with an external device; a memory that matches device information and setting information for integrated remote control setting, and stores same; and a controller that: acquires information about the external device; when device information identical to the acquired information is stored in the memory, performs integrated remote control setting for the external device using setting information that matches the stored device information; and when device information identical to the acquired information is not stored in the memory, displays, on the display, a screen for integrated remote control setting.

13 Claims, 13 Drawing Sheets

(51) Int. Cl.

| | | |
|---|---|---|
| *H04N 21/4363* | (2011.01) | |
| *H04N 21/44* | (2011.01) | |
| *H04N 21/442* | (2011.01) | |
| *H04N 21/81* | (2011.01) | |

(52) U.S. Cl.
CPC . *H04N 21/44008* (2013.01); *H04N 21/44227* (2013.01); *H04N 21/8186* (2013.01)

(58) Field of Classification Search
CPC ......... H04N 21/44227; H04N 21/8186; H04N 21/422; H04N 21/42204; H04N 21/4518; H04N 21/222; H04N 21/4363; H04N 21/485
See application file for complete search history.

(56) References Cited

U.S. PATENT DOCUMENTS

| | | | |
|---|---|---|---|
| 2014/0313419 A1 | 10/2014 | Kim et al. |
| 2015/0137959 A1 | 5/2015 | Kim et al. |
| 2017/0026606 A1 | 1/2017 | Kim et al. |
| 2019/0116334 A1 | 4/2019 | Lim et al. |
| 2020/0404358 A1 | 12/2020 | Lee et al. |
| 2021/0021904 A1 | 1/2021 | Kim |
| 2021/0136450 A1 | 5/2021 | Kim |

FOREIGN PATENT DOCUMENTS

| | | | |
|---|---|---|---|
| KR | 10-2015-0056273 A | 5/2015 |
| KR | 10-2019-0041690 A | 4/2019 |
| KR | 10-2019-0109964 A | 9/2019 |
| KR | 10-2021-0145397 A | 12/2021 |
| WO | WO 2021/251519 A1 | 12/2021 |

* cited by examiner

Figure 2:
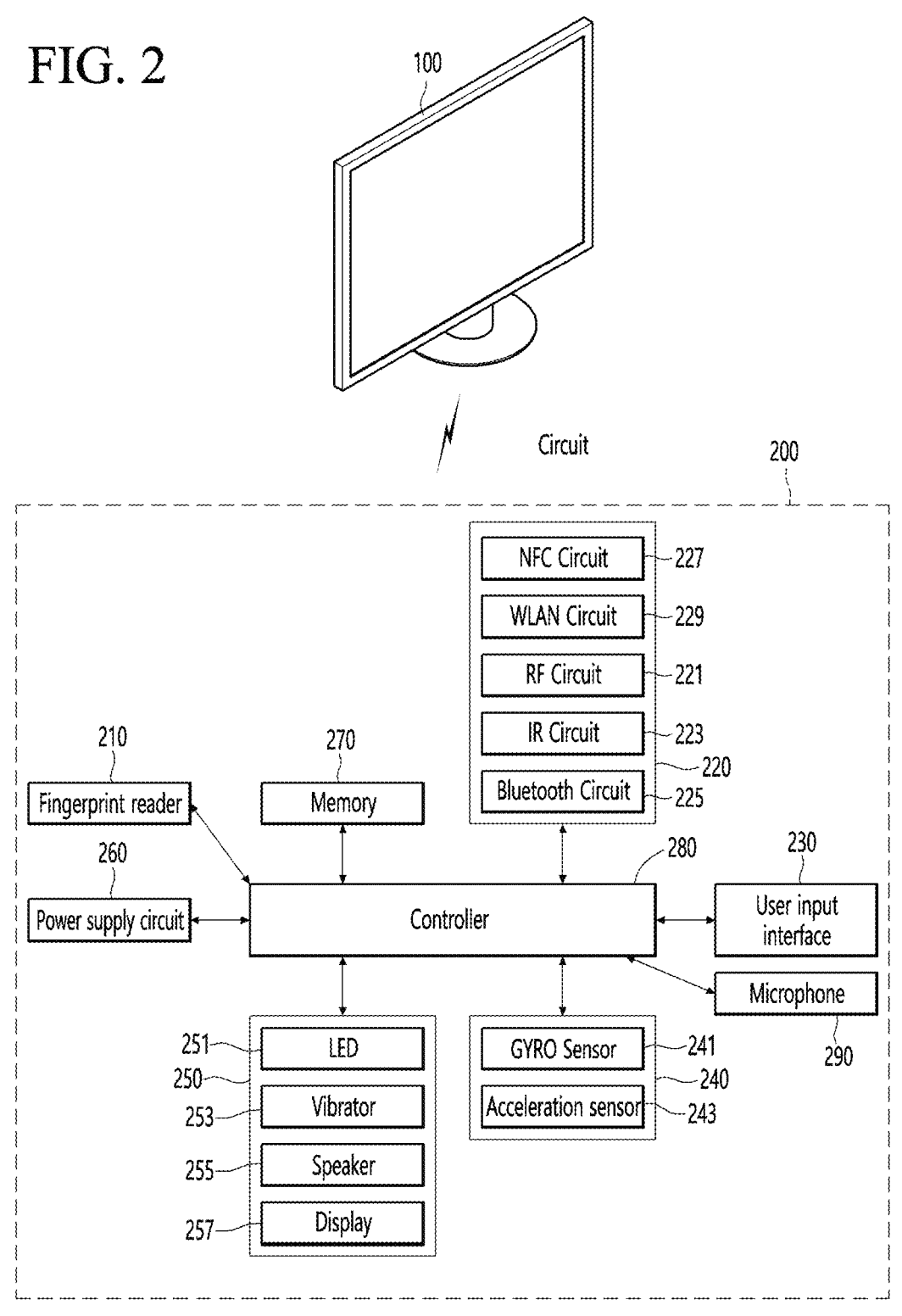

Circuit

200

NFC Circuit — 227

WLAN Circuit — 229

RF Circuit — 221

IR Circuit — 223

220

Bluetooth Circuit — 225

210

Fingerprint reader

270

Memory

260

Power supply circuit

280

Controller

230

User input interface

Microphone

290

251 — LED

250

253 — Vibrator

255 — Speaker

257 — Display

241 — GYRO Sensor

240

243 — Acceleration sensor

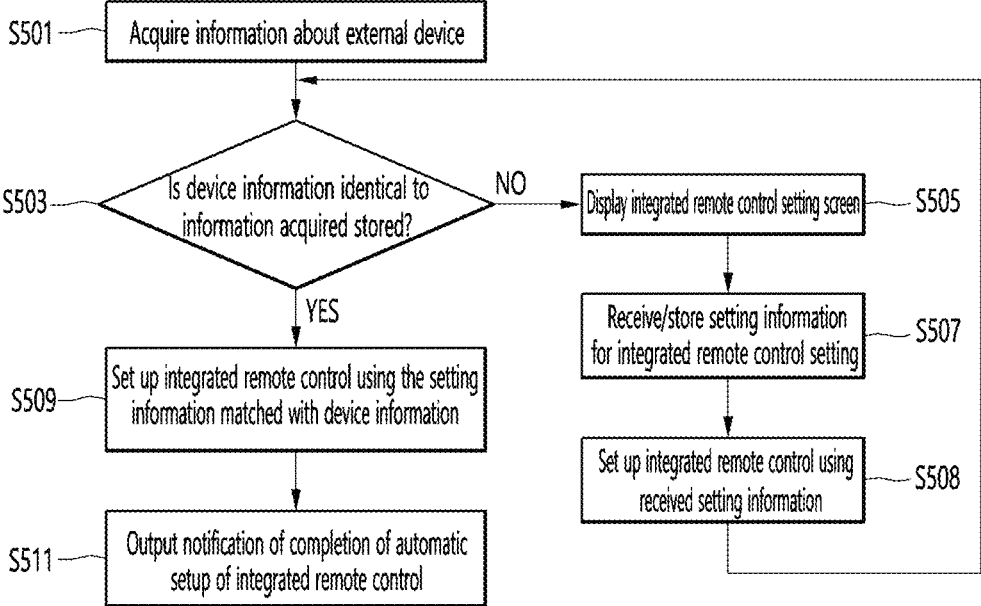

S501 — Acquire information about external device

S503 — Is device information identical to information acquired stored?

NO → S505 — Display integrated remote control setting screen

S507 — Receive/store setting information for integrated remote control setting

S508 — Set up integrated remote control using received setting information

YES

S509 — Set up integrated remote control using the setting information matched with device information S511 — Output notification of completion of automatic setup of integrated remote control

FIG. 6

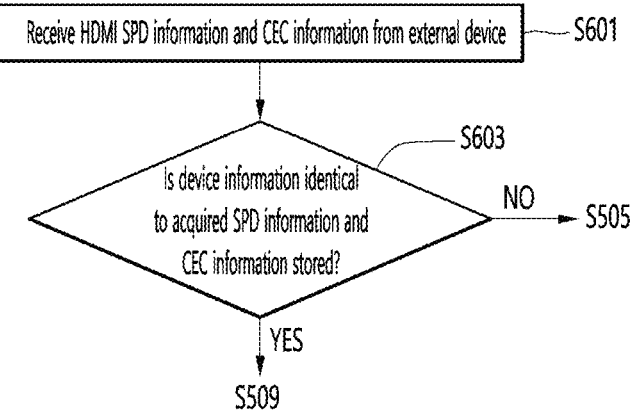

S601 — Receive HDMI SPD information and CEC information from external device

S603 — Is device information identical to acquired SPD information and CEC information stored?

NO → S505

YES

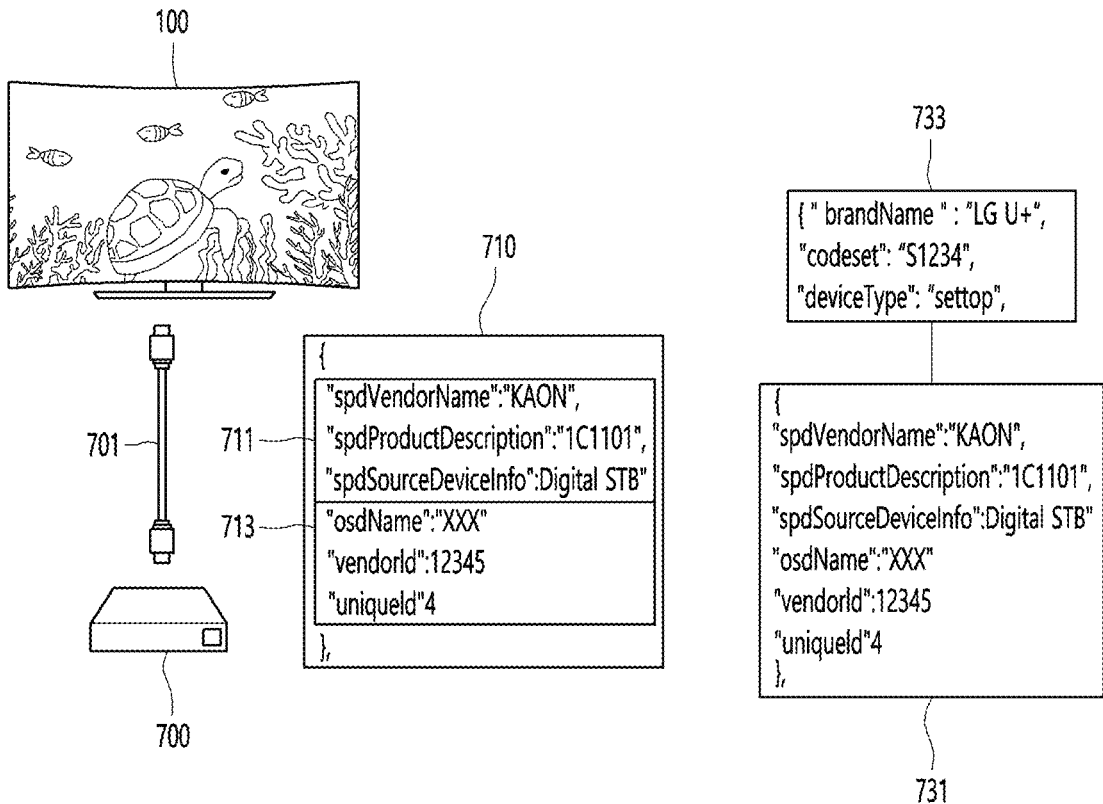

100

701

700

710

{

711 — "spdVendorName":"KAON",
"spdProductDescription":"1C1101",
"spdSourceDeviceInfo":Digital STB"

713 — "osdName":"XXX"
"vendorId":12345
"uniqueId"4

},

733

{" brandName " : "LG U+",
"codeset": "S1234",
"deviceType": "settop",

{
"spdVendorName":"KAON",
"spdProductDescription":"1C1101",
"spdSourceDeviceInfo":Digital STB"
"osdName":"XXX"
"vendorId":12345
"uniqueId"4
},

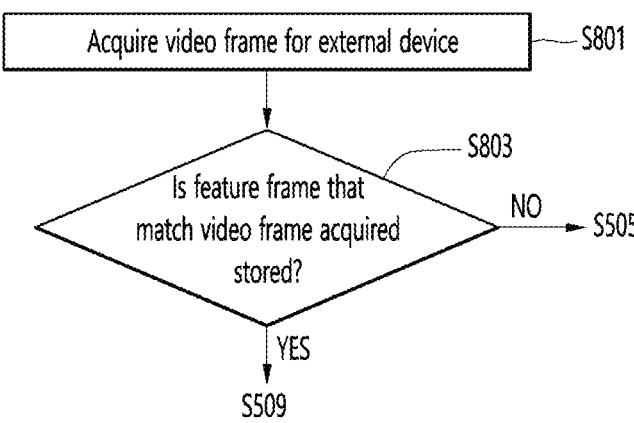

Acquire video frame for external device — S801

Is feature frame that match video frame acquired stored? — S803

NO → S505

YES
↓
S509

{"brandName" : "LG U+",
"codeset": "S1234",
"deviceType": "settop",

Integrated remote control manual setting status

DISPLAY DEVICE

CROSS REFERENCE TO RELATED APPLICATIONS

This application is the National Phase of PCT International Application No. PCT/KR2022/004173, filed on Mar. 24, 2022, which is hereby expressly incorporated by reference into the present application.

TECHNICAL FIELD

The present disclosure relates to a display device, and more specifically, to a display device for automatic setting of an integrated remote control.

BACKGROUND ART

The process of registering an external device connected to a display device such as a TV to a remote control (or remote control device) is called an integrated remote control setting process.

According to the integrated remote control setting, the user can control the display device and the external device connected to the display device with one remote control.

In the field, there are not many devices that sufficiently transmit HDMI (High Definition Multimedia Interface) CEC (Consumer Electronic Control)/SPD (Source Product Description) information that can specify the external device, so the device recognition rate is limited.

In addition, in the field, the device cannot be recognized because the device does not transmit HDMI CEC/SPD information.

In order to automatically recognize, it is necessary to obtain an actual external device, check the device information, and update the automatic recognition DB. However, due to practical constraints, data is collected and updated for only a few devices that can be tested and verified, so it is not easy to even maintain the automatic device recognition rate.

In this way, in the case of the current integrated remote control setting, if the remote control is disconnected, the user must repeatedly perform the complex integrated remote control setting to reconnect, which is inconvenient.

DISCLOSURE

Technical Problem

The purpose of this disclosure is to store information for setting and automatically set up the integrated remote control function using the stored information, when setting up the integrated remote control for the first time.

The purpose of this disclosure is to receive a video provided by an external device from a server through a network, and to automatically set up the integrated remote control function based on the received video.

The purpose of this disclosure is to capture a video provided by an external device even when the network connection with the server is disconnected, and to automatically set up the integrated remote control function based on the captured video.

Technical Solution

A display device according to an embodiment of the present disclosure comprises a display, an external device interface configured to provide a connection path with an external device, a memory configured to match and store device information and setting information for integrated remote control setting, and a controller configured to acquire information about the external device, if device information identical to the acquired information is stored in the memory, perform integrated remote control setting for the external device using setting information matched with the stored device information, and if device information identical to the acquired information is not stored in the memory, display a screen for integrated remote control setting on the display.

An operating method of a display device according to an embodiment of the present disclosure comprises acquiring information about an external device, if device information identical to the acquired information is stored in a memory of the display device, performing integrated remote control setting for the external device using setting information matching the stored device information, and if device information identical to the acquired information is not stored in the memory, displaying a screen for the integrated remote control setting.

Advantageous Effects

According to an embodiment of the present disclosure, integrated remote control setting can be automatically performed when reconnecting an external device by using device information of a previously set integrated remote control. Accordingly, integrated remote control setting can be automatically performed without a separate complicated process when reconnecting an external device after disconnection, so that user convenience can be greatly improved.

According to an embodiment of the present disclosure, even when HDMI SPD/CEC information cannot be received from an external device, integrated remote control setting can be automatically performed by receiving video feature information through a network. Accordingly, integrated remote control setting can be automatically performed even when there are restrictions according to the characteristics of the external device.

According to an embodiment of the present disclosure, integrated remote control setting can be automatically performed by using video information of an external device even when not connected to a cloud server through a network. Accordingly, integrated remote control setting can be automatically performed even when there are restrictions on the external device and restrictions on the network environment.

DESCRIPTION OF DRAWINGS

FIG. 2 is a block diagram of a remote control device according to an embodiment of the present disclosure.

FIG. 3 shows an example of an actual configuration of a remote control device according to an embodiment of the present disclosure.

FIG. 5 is a flowchart explaining an operating method of a display device according to an embodiment of the present disclosure.

FIG. 6 and FIG. 7 are diagrams explaining a process of performing automatic setting of an integrated remote control based on HDMI SPD/CEC information received from an external device according to an embodiment of the present disclosure.

FIG. 8 and FIG. 9 are diagrams explaining a process of performing automatic setting of an integrated remote control based on video information received from a cloud server when a display device and a cloud server are network-connected according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
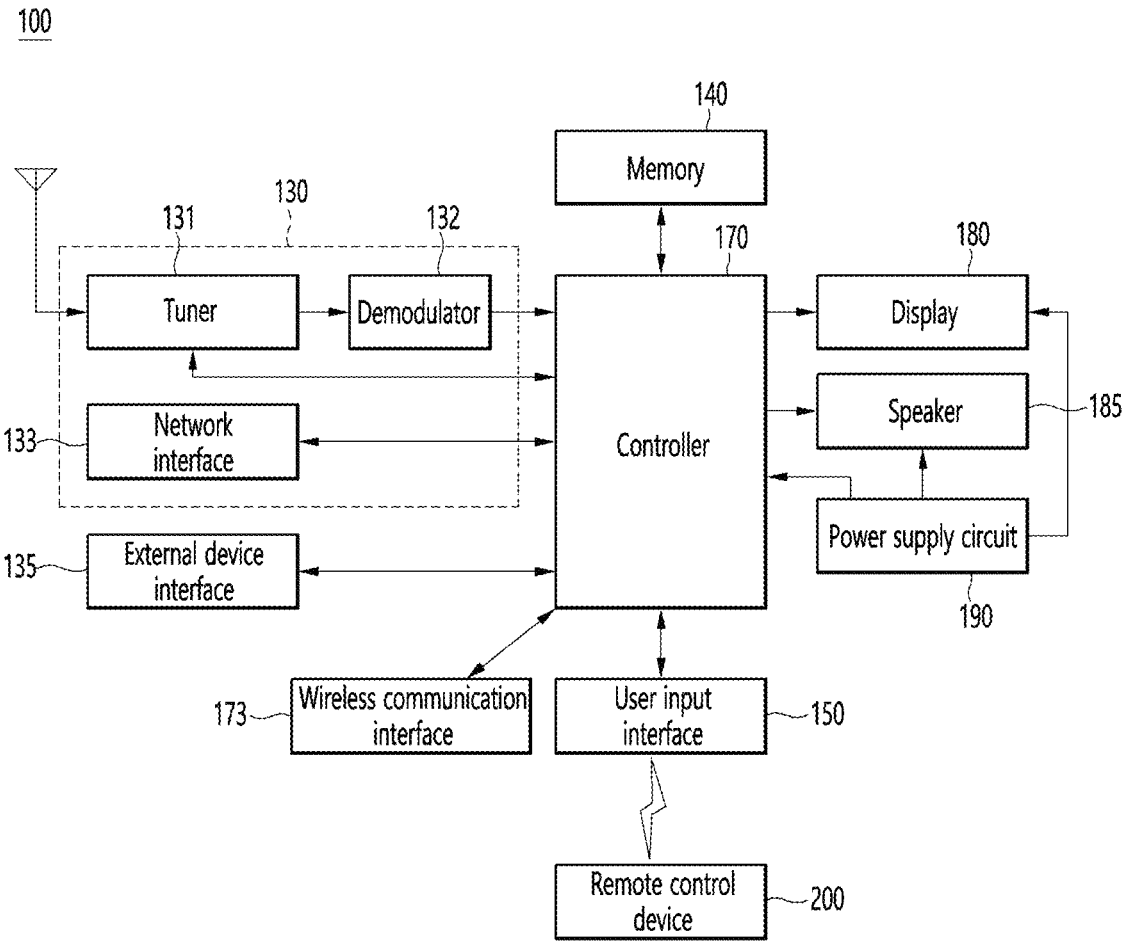
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a contents provider or a network operator. That is, the network interface 133 may receive content such as movies, advertisements, games, VOD, and broadcast signals and information related thereto provided from a contents provider or a network provider through a network.

In addition, the network interface 133 may receive update information and update files of firmware provided by the network operator, and may transmit data to an Internet or contents provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 3:
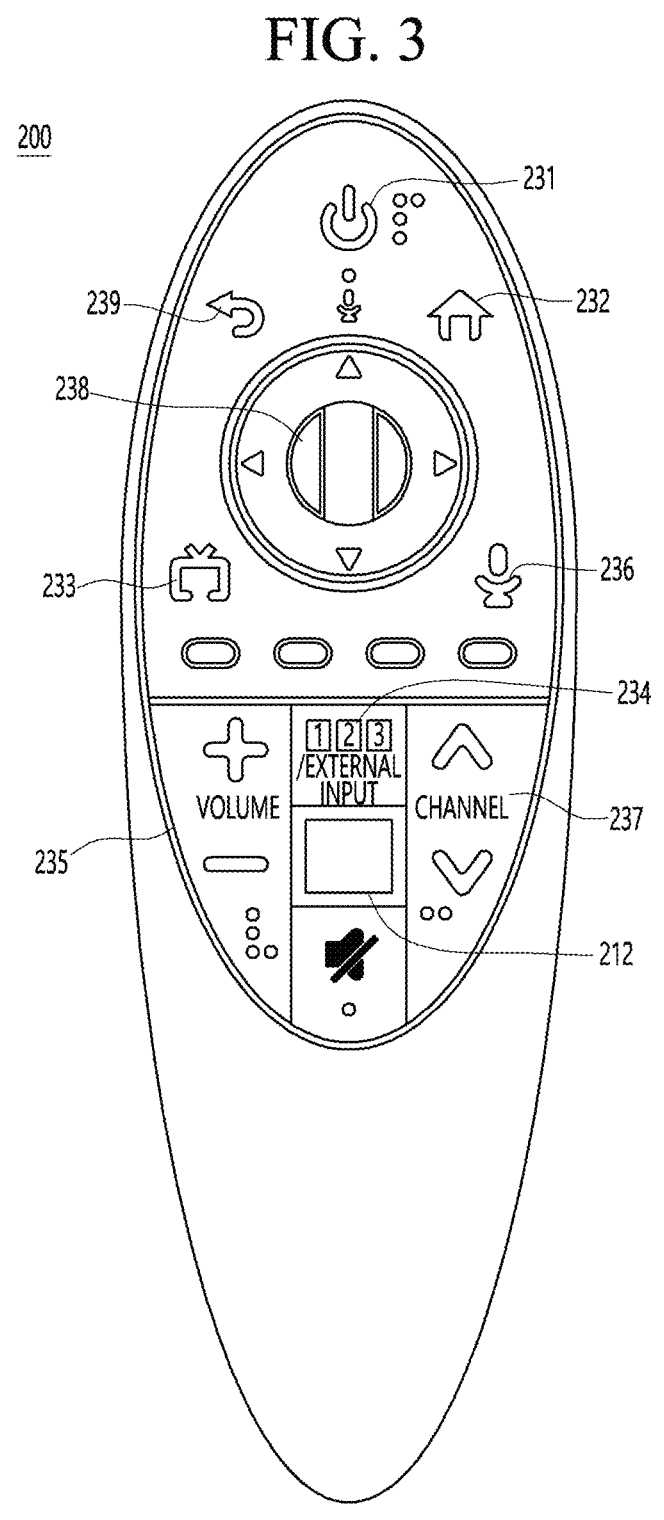

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
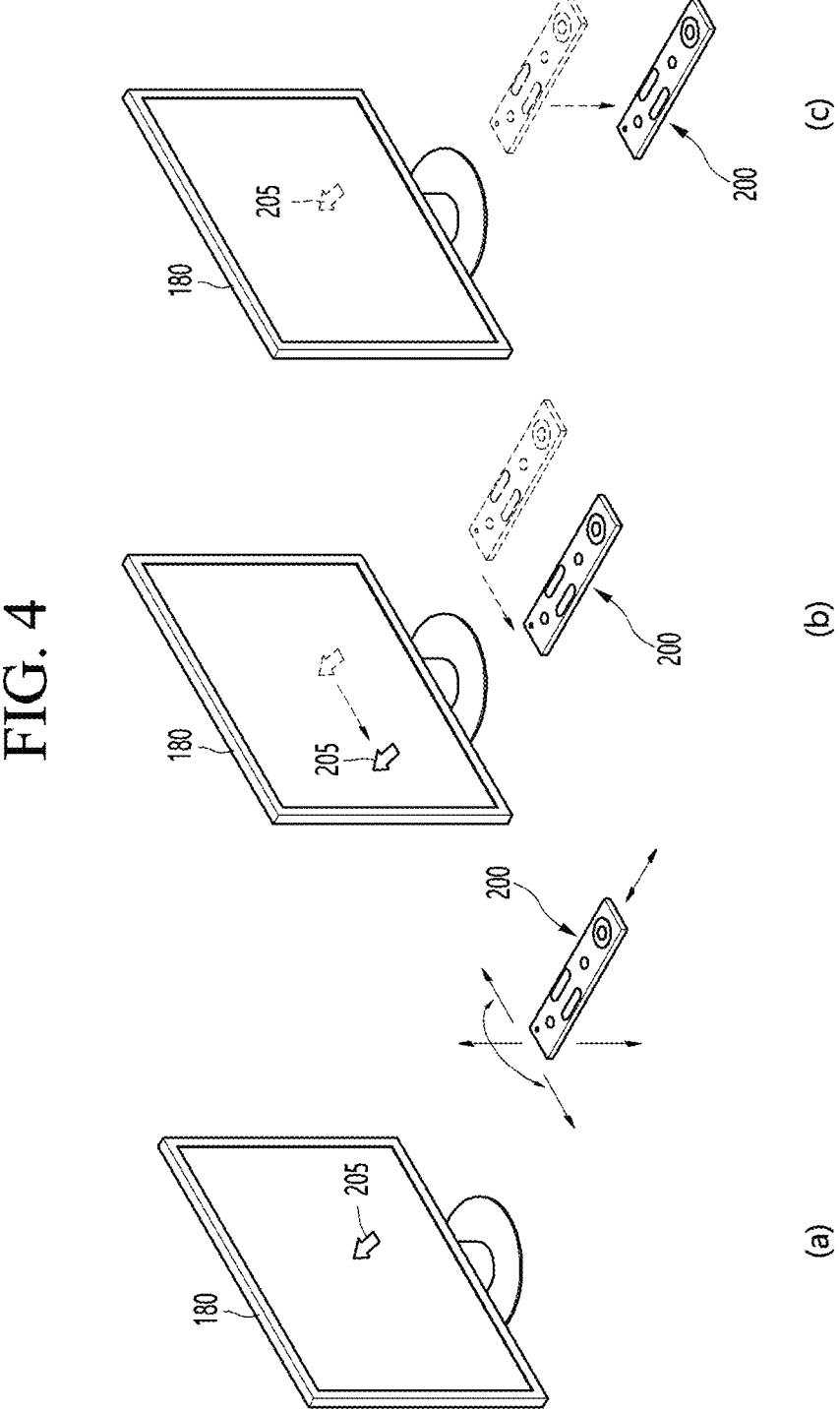
FIG. 4 shows an example of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

FIG. 5 is a flowchart for explaining an operation method of a display device according to an embodiment of the present disclosure.

The controller 170 of the display device 100 acquires information about an external device connected through the external device interface 135 (S501).

In one embodiment, the external device interface 135 may include one or more HDMIs.

The controller 170 may receive information about an external device connected through the HDMI from the external device.

The information about the external device may include one or more of HDMI Source Product Description (SPD) information or HDMI Consumer Electronic Control (CEC) information.

The HDMI SPD information may include a vendor name, a product description identifier, and a type of the external device.

The HDMI CEC information may include a name of the external device, a manufacturer identifier of the external device, and a unique identifier.

When the external device is connected through the external device interface 135, the controller 170 may receive information about the external device from the external device.

Information about an external device may include a captured image of a video or feature information of a video based on a video signal received from an external device when the external device is connected.

When the controller 170 is connected to the cloud server through a network, the controller 170 can receive a captured image of the video or feature information of the video from the cloud server.

In another embodiment, when the controller 170 is not connected to the cloud server through a network, the controller 170 can independently acquire a captured image of the video or feature information of the video.

The controller 170 determines whether device information identical to the acquired information about the external device is stored in the memory (140) (S503).

The device information may be any one of information about the external device received from the external device, video information acquired from the cloud server, and video capture information that captures the video output from the external device by the display device 100 when the external device is connected.

Meanwhile, step S503 and the steps thereafter may be performed when automatic recognition is not performed due to reconnection of the external device. In the case where automatic recognition is not performed, this may indicate a case where the integrated remote control setting is not performed automatically due to reasons such as inability to receive information from an external device due to the connection of the external device.

If the device information identical to the information about the acquired external device is not stored in the memory 140, the controller 170 displays the integrated remote control setting screen on the display 180 (S505).

The integrated remote control setting screen may be a process of acquiring a code set of a remote control device 200 to control an external device connected to the display device 100 through the remote control device 200.

The controller 170 sets the integrated remote control according to reception of the setting input (S507).

In one embodiment, the integrated remote control setting process may be a process of the display device 100 transmitting a code set for controlling an external device to the remote control device.

The controller 170 may acquire a code set based on external device information and transmit the acquired code set to the remote control device 200 through the user input interface 150.

The controller 170 may transmit the code set to the remote control device 200 in the form of an IR signal.

The memory 140 may store a plurality of code sets corresponding to each of a plurality of external devices. Each code set may include a plurality of codes corresponding to each of a plurality of control operations.

The controller 170 can acquire a code set matching the external device information from the memory 140 and transmit the acquired code set to the remote control device 200.

The controller 170 can receive a plurality of code sets from an external server.

In another embodiment, the integrated remote control setting process can mean a process in which the display device 100 acquires a code set for controlling the external device, a manufacturer of the external device, and a type of the external device.

The controller 170 can acquire the brand name (or manufacturer name) of the external device and the external device type based on the IR signal input through the integrated remote control setting screen. The controller 170 can acquire a code set for controlling the external device using the acquired brand name of the external device and the type of the external device.

The controller 170 can acquire a code set from the memory 140 or an external server using the acquired brand name of the external device and the type of the external device.

If the device information identical to the information about the acquired external device is stored in the memory 140, the controller 170 sets the integrated remote control using the setting information matched with the device information (S509).

The memory 140 can store each of the device information and the setting information for a plurality of external devices by matching them.

In one embodiment, the setting information for the integrated remote control setting may include a code set of a remote control device (200, hereinafter, remote control), a brand name (or manufacturer name) of an external device, and a type of an external device.

The setting information may be matched to the device information and stored in the memory 140. The setting information may be information manually entered for the integrated remote control setting.

If device information identical to the information for the external device is read out, the controller 170 may acquire setting information that matches the read out device information.

The controller 170 may automatically perform the integrated remote control setting using the code set included in the setting information.

The controller 170 outputs a notification notifying that the integrated remote control has been automatically set (S511).

The controller 170 can display a notification notifying that the automatic setting of the integrated remote control has been completed on display 180 after the automatic setting of the integrated remote control.

FIGS. 6 and 7 are diagrams explaining a process of performing automatic setting of the integrated remote control based on HDMI SPD/CEC information received from an external device according to an embodiment of the present disclosure.

Referring to FIG. 6, the controller 170 receives HDMI SPD information and CEC information from an external device connected via external device interface 135 (S601).

Referring to FIG. 7, display device 100 and external device 700 can be connected to each other via HDMI cable 701. The external device 700 can be a set-top box.

The display device 100 can receive HDMI SPD information 711 and HDMI CEC information 713 from the external device 700.

The HDMI SPD information 711 can include the name of the subcontractor or chip provider of the external device 700, the product description identifier, and set-top box information.

The HDMI CEC information 713 can include the name of the external device 700, the manufacturer identifier of the external device 700, and a unique identifier assigned during the CEC communication process.

The unique identifier may change each time it is connected, and thus may not be used when compared with the device information stored in the memory 140.

The controller 170 determines whether the device information identical to the received HDMI SPD information and CEC information is stored in the memory 140 (S603).

In memory 140, device information 731 and setting information 733 acquired in the previous integrated remote control manual setting process are matched and stored.

The controller 170 can determine whether there is information identical to information about an external device 710 including HDMI SPD information 711 and HDMI CEC information 713 through memory 140.

If the device information identical to the received HDMI SPD information and CEC information is not stored in the memory 140, the controller 170 performs step S505 (integrated remote control manual setting).

If the device information identical to the received HDMI SPD information and CEC information is stored in the memory 140, the controller 170 performs step S509 (integrated remote control automatic setting).

If the information 710 about the external device 710 and the device information 731 are the same, the controller 170 can acquire the setting information 733 that matches the device information 731.

The controller 170 can perform automatic setting of the integrated remote control using the acquired setting information 733.

The controller 170 can match the brand name of the external device 700 and the type of the external device 700 to the external device and store them, and transmit a code set for controlling the external device 700 to the remote control 200.

In this way, according to the embodiment of the present disclosure, when the external device is reconnected, the integrated remote control setting can be automatically performed using the device information of the previously set integrated remote control.

Accordingly, when the external device is disconnected and reconnected, the integrated remote control setting can be automatically performed without a separate complicated process, so that the user convenience can be greatly improved.

Figure 9:
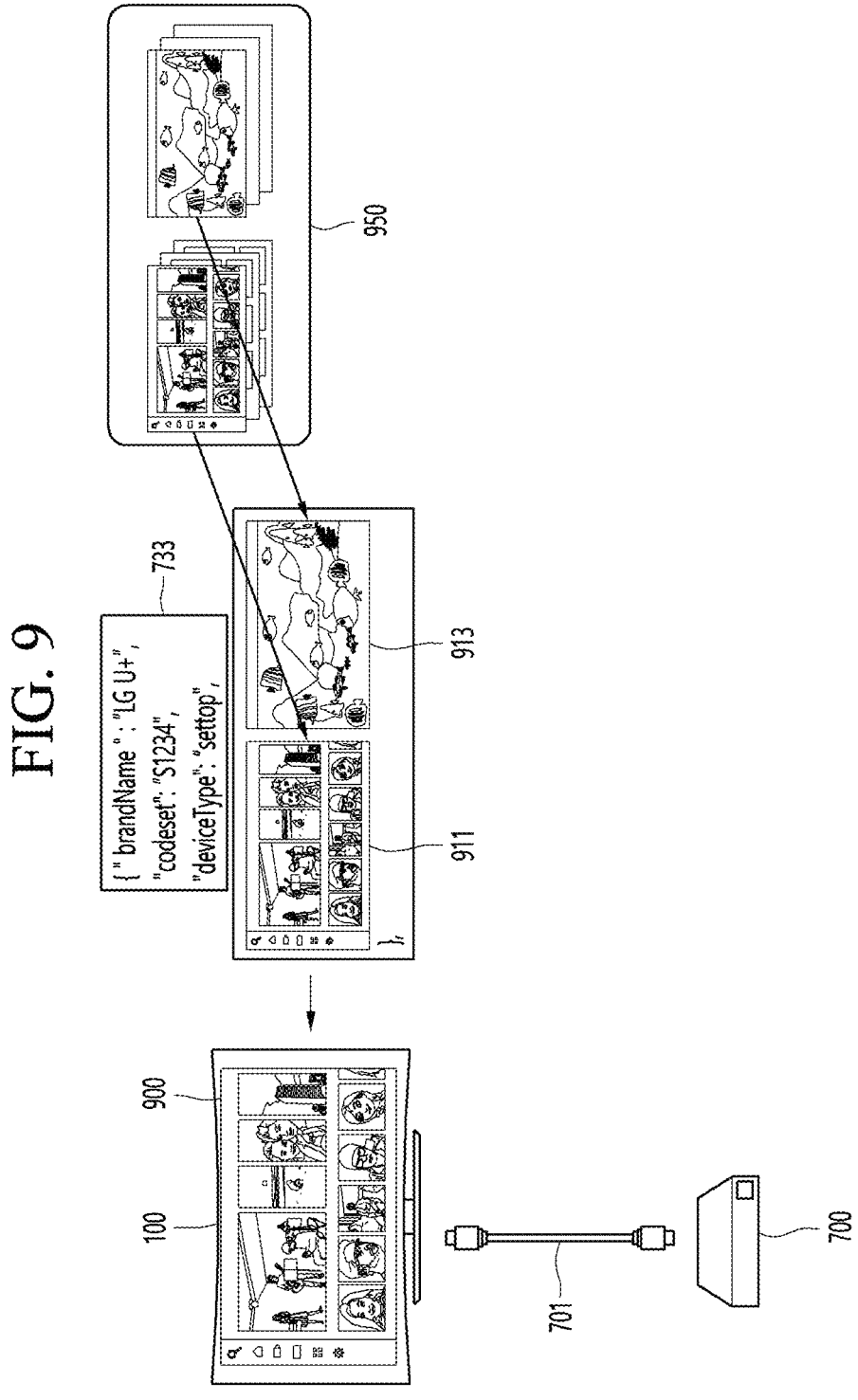

FIG. 8 and FIG. 9 are drawings explaining a process of performing automatic setting of the integrated remote control based on video information received from the cloud server when the display device and the cloud server are connected to a network according to the embodiment of the present disclosure.

The network interface 133 of the display device 100 can communicate with the cloud server through IP (Internet Protocol) communication.

Referring to FIG. 8, the controller 170 acquires a video frame for an external device through the external device interface 135 (801).

Referring to FIG. 9, the display device 100 and the external device 700 can be connected to each other through the HDMI cable 701. The external device 700 can be a set-top box.

The controller 170 can capture a video 900 displayed on the display 180 based on a video signal received from the external device 700, and can acquire a video frame by the capture.

The captured video frame may correspond to a home screen or banner screen of the set-top box 700.

When the external device 700 is connected, the controller 170 may acquire the video frame by capturing the initial screen provided by the external device 700.

The controller 170 determines whether a feature frame matching the acquired video frame is stored in the memory 140 (S803).

The memory 140 may match and store the setting information and the feature frame during the integrated remote control manual setting process.

When the integrated remote control is manually set, the controller 170 may receive one or more feature frames 911, 913 corresponding to the external device 700 from the cloud server 950 through the network interface 133.

The controller 170 may request a feature frame from the cloud server 950 at the time of acquiring the setting information during the manual setting process of the integrated remote control, and may receive one or more feature frames 911, 913 in response to the request.

The controller 170 may match the received one or more feature frames 911, 913 and the setting information 733 and store them in the memory 140.

The memory 140 may match and store the setting information for a plurality of external devices and each of a plurality of feature frames.

The controller 170 can compare the video frame acquired in step S801 with the feature frame stored in memory 140, and extract a feature frame having a matching rate of a certain percentage as a result of the comparison.

The matching rate may be 90%, but this is only an example.

The controller 170 can extract a plurality of feature points from the acquired video frame, and extract a plurality of feature points from the feature frame.

If the similarity between the extracted feature points is above a certain percentage, the controller 170 can determine that the matching rate is above a certain percentage.

If the feature frame matching the acquired video frame is stored in the memory 140, the controller 170 sets the integrated remote control using the setting information matching the feature frame (S509).

The controller 170 can acquire setting information 733 corresponding to the feature frame matching the video frame.

The controller 170 can automatically perform integrated remote control setting using the acquired setting information 733.

If the feature frame matching the acquired video frame is not stored in the memory 140, the controller 170 performs step S505.

In this way, according to the embodiment of the present disclosure, even if HDMI SPD/CEC information cannot be received from an external device, integrated remote control setting can be automatically performed by receiving video feature information through a network.

Accordingly, integrated remote control setting can be automatically performed even if there is a limitation according to the characteristics of the external device.

Figure 10:
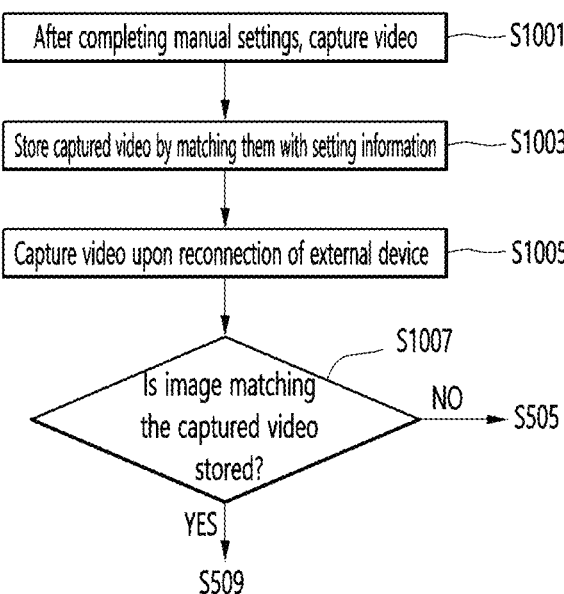
FIG. 10 and FIG. 11 are diagrams explaining a process of performing automatic setting of an integrated remote control using captured videos when manually setting an integrated remote control when a display device and a cloud server are not connected to a network according to an embodiment of the present disclosure.
Figure 11:
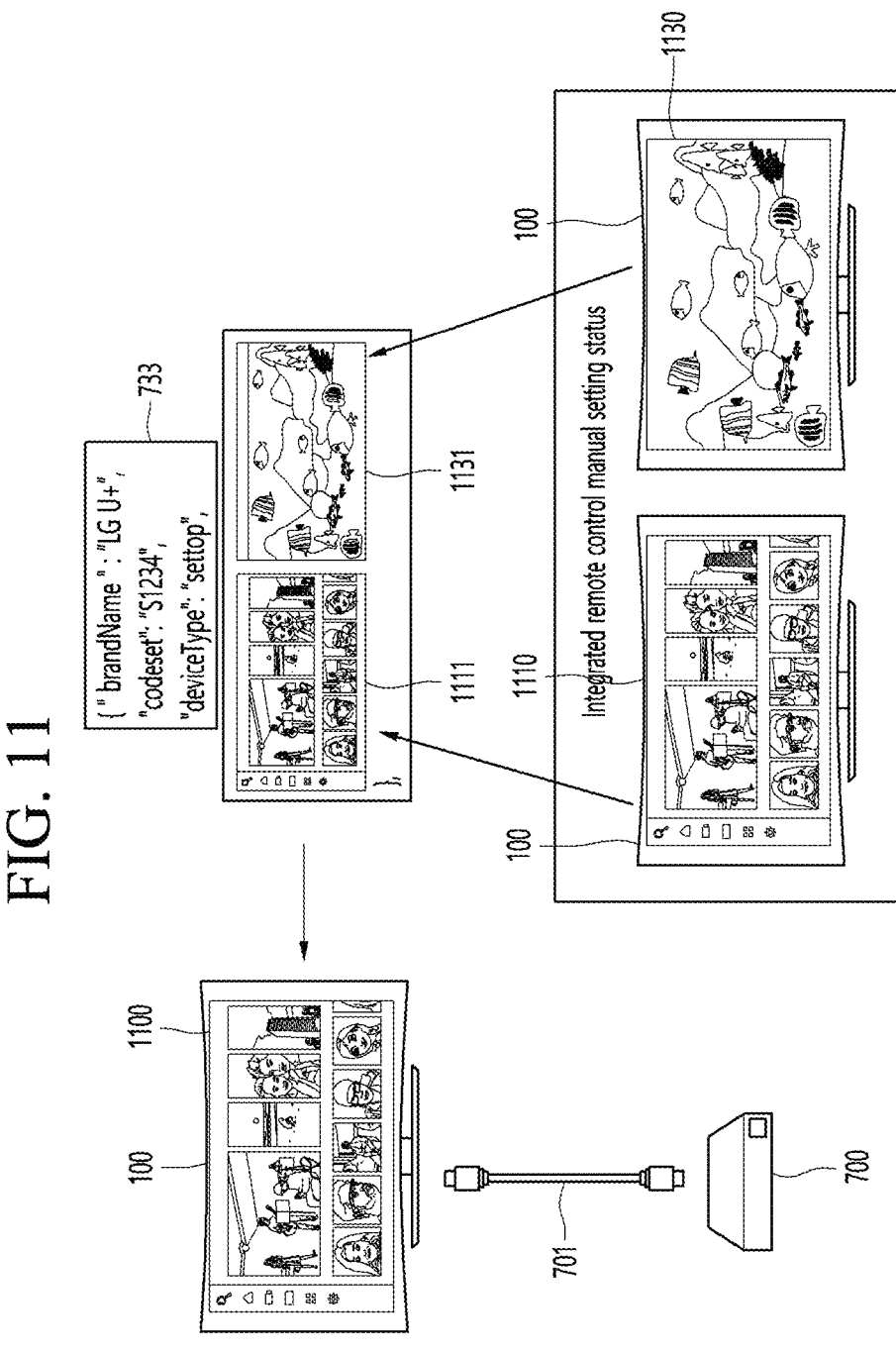

FIG. 10 and FIG. 11 are drawings explaining a process of performing automatic setting of an integrated remote control using captured video when manually setting an integrated remote control when a display device and a cloud server are not connected to a network according to an embodiment of the present disclosure.

Referring to FIG. 10 and FIG. 11, a display device 100 and an external device 700 may be connected to each other via an HDMI cable 701. The external device 700 may be a set-top box.

Referring to FIG. 10, after the external device 700 is connected and the manual setting of the integrated remote control is completed, the controller 170 captures a video based on a video signal received from the external device 700 (S1001).

For example, the controller 170 may display first video 1110 or second video 1130 based on a video signal received from external device 700 after the integrated remote control manual setting is completed as illustrated in FIG. 11.

The first video 1110 may be a home screen video displayed according to a home key input received from remote control 200.

The second video 1130 may be a channel video displayed according to a channel change input received from remote control 00. The channel change input may be any one of channel up key input, channel down ken input, and number key input.

The controller 170 may periodically capture and store the video while the external device 700 is connected, considering that the UI of the video changes according to a software update of the external device 700.

That is, the controller 170 can periodically capture the home screen video or the channel video according to channel change action, and re-match the captured video frame with the setting information 733.

The controller 170 matches the captured video with the setting information 733 acquired during manual setting of the integrated remote control and stores it in the memory 140 (S1003).

The controller 170 can capture the first video 1110, which is the home screen video, and store the captured first video frame 1111 in the memory 140 by matching it with the setting information 733.

The controller 170 can capture the second video 1131, which is the channel video, and store the captured second video frame 1131 in the memory 140 by matching it with the setting information 733.

In other words, one or more of the first video frame 1111 and the second video frame 1131 may be matched to the setting information 733.

After the external device 700 is disconnected, the controller 170 captures the video 1100 based on the video signal received from the external device 700 upon reconnection (S1005).

The controller 170 determines whether an image matching the captured video is stored in the memory 140 (S1007).

The controller 170 can compare the captured video with the video frames stored in the memory 140 and determine whether a video frame with a matching rate higher than a certain ratio is stored.

If the image matching the captured video is stored in memory 140, the controller 170 acquires setting information matching the stored image and automatically performs integrated remote control setting using the acquired setting information (S509).

If the controller 170 searches for a video frame with a matching rate of more than a certain percentage with the captured video, the controller 170 can acquire setting information 733 matching the searched video frame.

If the image matching the captured video is not stored in memory 140, the controller 170 performs integrated remote control manual setting according to step S505.

In this way, according to the embodiment of the present disclosure, even if the cloud server is not connected through a network, the integrated remote control setting can be automatically performed using the video information of the external device.

Accordingly, even if there are limitations of the external device and limitations in the network environment, the integrated remote control setting can be automatically performed.

Figure 12:
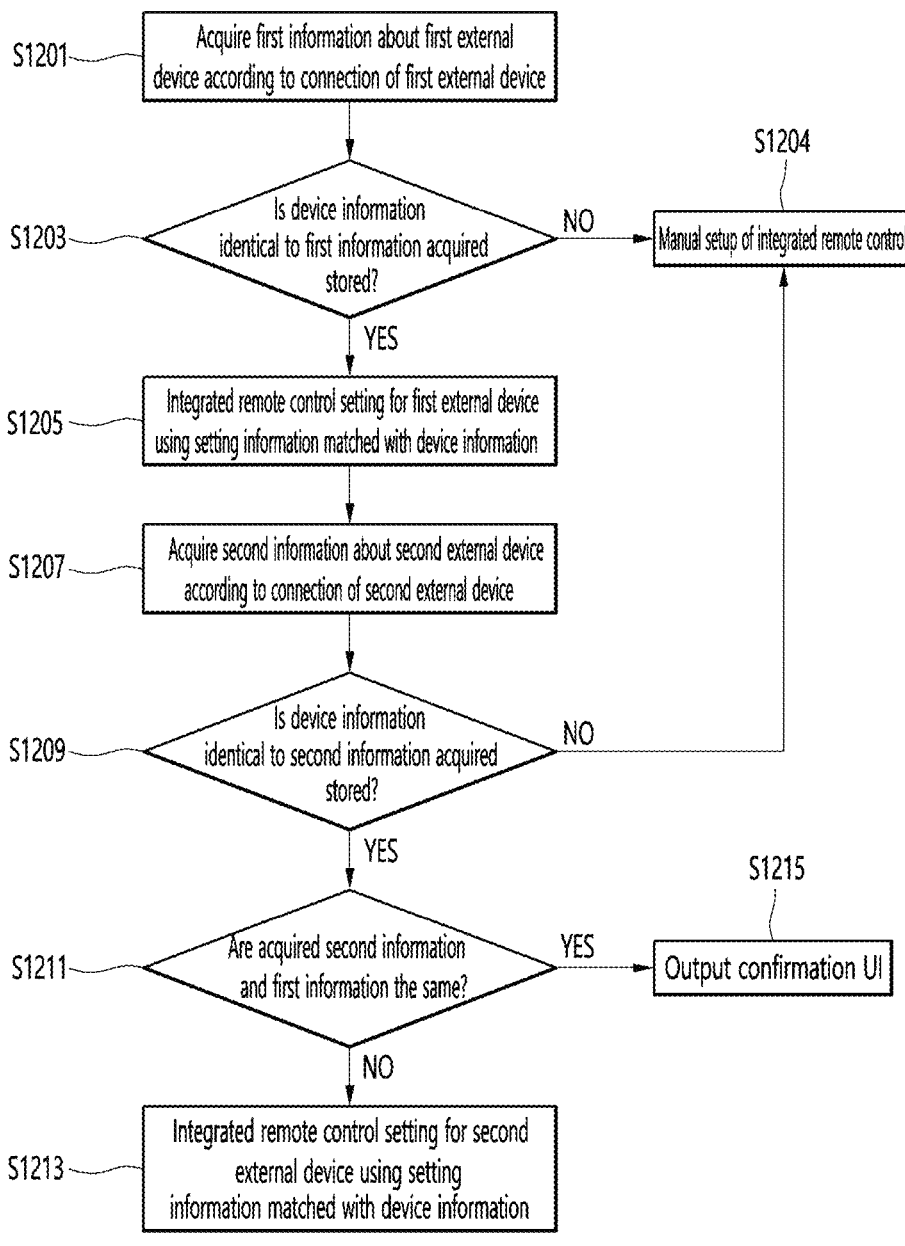
FIG. 12 to FIG. 14 are diagrams explaining an integrated remote control setting method when information on multiple external devices connected to a display device is the same.
Figure 13:
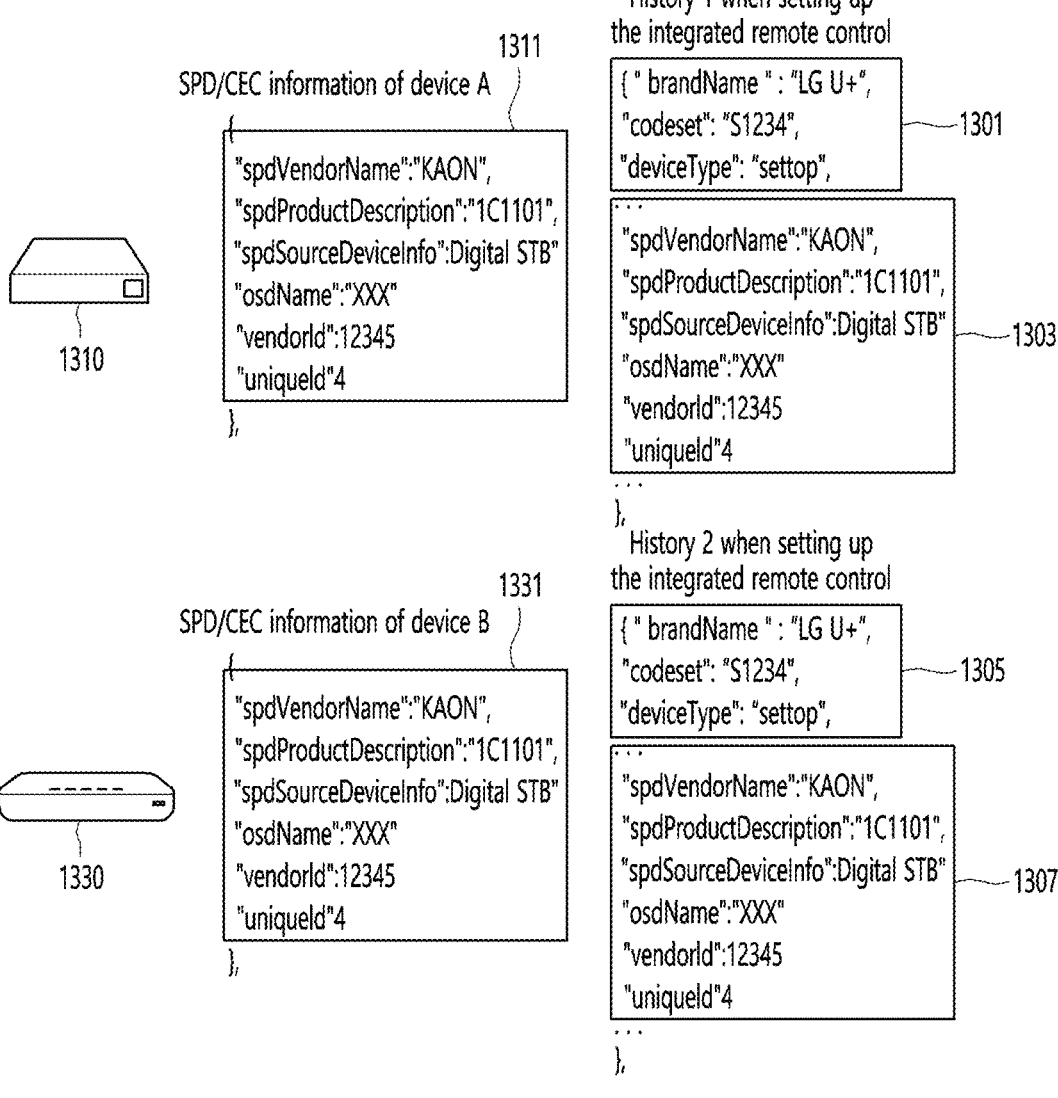
Figure 14:
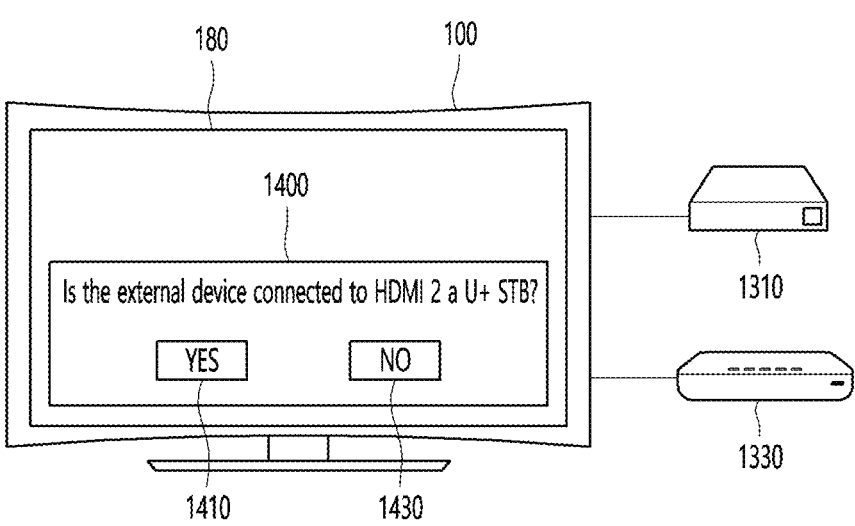

FIGS. 12 to 14 are drawings explaining an integrated remote control setting method when information on a plurality of external devices connected to a display device is the same.

In FIGS. 12 to 14, it is assumed that the first external device 1310 and the second external device 1330 are sequentially connected to the external device interface 135.

In addition, it is assumed that the first external device 1310 and the second external device 1330 are set-top boxes.

Referring to FIG. 12, the controller 170 acquires first information 1311 about the first external device 1310 according to the connection of the first external device 1310 (S1201).

The first information 1311 may include HDMI SPD information and HDMI CEC information received from the first external device.

The controller 170 determines whether the device information identical to the acquired first information 1311 is stored in the memory 140 (S1203).

If the device information 1303 identical to the first information 1311 is stored, the controller 170 automatically performs integrated remote control setting for the first external device 1310 using the setting information 1301 matching the stored device information 1303 (S1205).

If the device information identical to the first information 1311 is not stored, the controller 170 performs integrated remote control manual setting (S1204).

The controller 170 acquires second information 1331 about the second external device 1330 according to the connection of the second external device 1330 while the first external device 1310 is connected (S1207).

The controller 170 determines whether device information identical to the acquired second information 1331 is stored in the memory 140 (S1209).

If the device information identical to the second information 1331 is stored, the controller 170 determines whether the first information 1311 and the second information 1331 are identical (S1211).

If the first information and the second information are different, the controller 170 automatically performs integrated remote control setting for the first external device using the setting information matching the device information corresponding to the second information (S1213).

If the first information and the second information are identical, the controller 170 outputs a confirmation UI (S1215).

The confirmation UI (User Interface) may be a pop-up window for confirming whether the setting information matching the second information is correct.

As illustrated in FIG. 14, the controller 170 may display a confirmation UI 1400 on the display 180 for confirming whether the setting information matching the second information is the setting information of the external device.

When the controller 170 selects the consent button 1410 included in the confirmation UI 1400, the controller 170 can automatically perform integrated remote control setting for the second external device using the corresponding setting information.

When the controller 170 selects the disagree button 1430 included in the confirmation UI 1400, the controller 170 can display a screen for manual setting of the integrated remote control for the second external device.

The setting information 1305 entered through the manual setting can be matched with the device information 1307 and stored in the memory 140.

In this way, according to the embodiment of the present disclosure, when a plurality of external devices having information about the same external device are connected, the integrated remote control can be automatically set according to the connection order. In addition, a confirmation UI 1400 can be provided to prevent errors in setting for external devices connected later.

Figure 15:
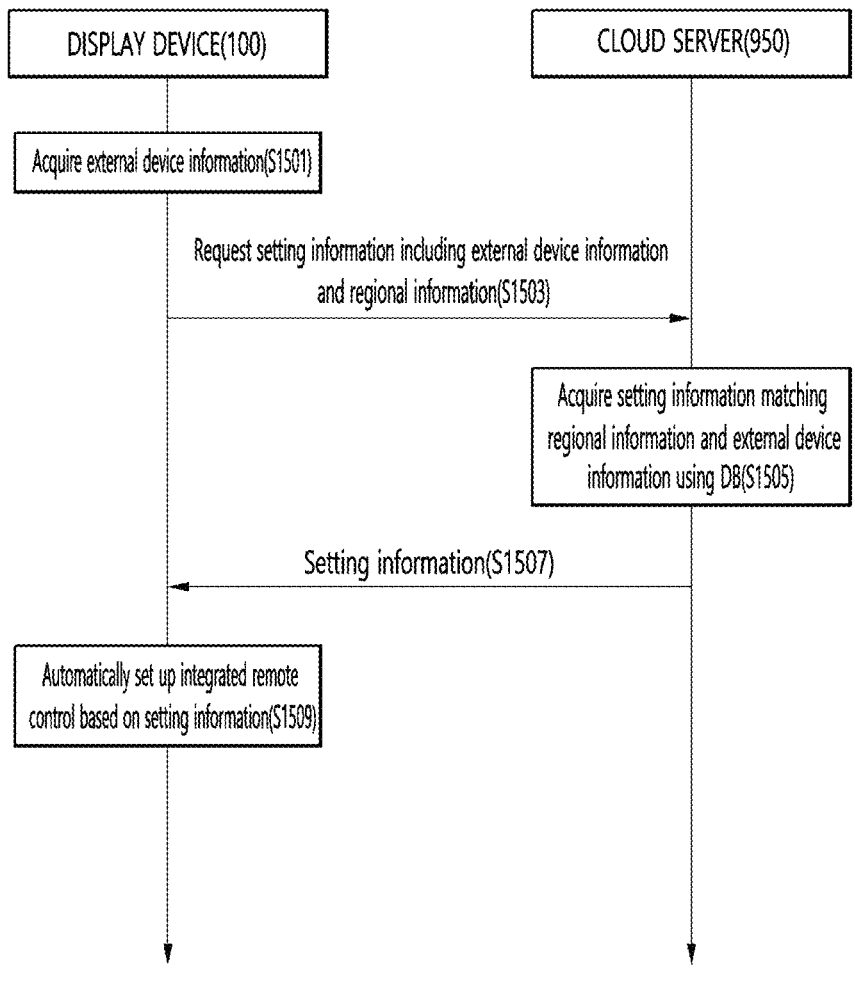
FIG. 15 is a diagram explaining an automatic setting method of an integrated remote control according to another embodiment of the present disclosure.

FIG. 15 is a drawing explaining a method for automatically setting an integrated remote control according to another embodiment of the present disclosure.

In particular, FIG. 15 is an example explaining a method for automatically performing integrated remote control setting for an external device without a single manual setting of an integrated remote control.

Referring to FIG. 15, the controller 170 of the display device 100 acquires external device information (S1501).

In one embodiment, the external device information may include HDMI SPD/CEC information.

The controller 170 of the display device 100 transmits a setting information request including acquired external device information and regional information on the area where the display device 100 is located to the cloud server 950 through the network interface 133 (S1503).

In one embodiment, the controller 170 can receive regional information on the area where the display device 100 is located from the cloud server 950 or an external server through the network.

The controller 170 can transmit a setting information request including regional information and external device information to the cloud server 950 for automatic setting of the integrated remote control of the external device.

The cloud server 950 acquires setting information matching the regional information and external device information using the database (S1505), and transmits the acquired setting information to the display device 100 (S1507).

The cloud server 950 may store a data set matching the regional information, external device information, and setting information in the database.

The cloud server 950 may collect external device information and setting information from a plurality of display devices located in a specific region. The cloud server 950 may match the regional information to the collected external device information and setting information and store it in the database.

The setting information may include the brand name (or manufacturer name) of the external device, the type of the external device, and the code set.

The controller 170 of the display device 100 automatically performs integrated remote control setting for the external device based on the received setting information (S1509).

In this way, according to the embodiment of FIG. 15, integrated remote control setting can be automatically performed without a process of manual setting of an integrated remote control for an external device.

Therefore, even in an environment where there are restrictions on HDMI information or video information of an external device, integrated remote control setting for an external device can be automatically performed, so that user convenience can be greatly improved.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:
a display;
an external device interface configured to provide a connection path with an external device;
a memory configured to match and store device information and setting information for integrated remote control setting; and
a controller configured to:
acquire information about the external device,
if device information identical to the acquired information is stored in the memory, perform integrated remote control setting for the external device using setting information matched with the stored device information, and if device information identical to the acquired information is not stored in the memory, display a screen for integrated remote control setting on the display,
wherein the device information stored in the memory includes a feature frame received from a server, and
the controller is configured to:
acquire a video frame based on a video signal received from the external device, and
if the feature frame matching the acquired video frame is stored in the memory, perform the integrated remote control setting using the setting information matching the feature frame.

2. The display device of claim 1, wherein the information about the external device includes HDMI (High Definition Multimedia Interface) SPD (Source Product Description) information and HDMI CEC (Consumer Electronic Control) information received through the external device interface.

3. The display device of claim 2, wherein the controller is configured to, if the device information identical to the information about the external device including the HDMI SPD information and the HDMI CEC information is stored in the memory, read-out setting information matching the stored device information and perform the integrated remote control setting using the read-out setting information.

4. The display device of claim 1, further comprising a network interface for network connection with the server, and
the controller is configured to receive the feature frame from the server through the network interface when manually setting the integrated remote control for the external device.

5. The display device of claim 1, wherein the controller is configured to:
capture a video based on a video signal received from the external device after the external device is disconnected and reconnected, and
if an image matching the captured video is stored in the memory, perform the integrated remote control setting using the setting information matching the stored video.

6. The display device of claim 5, wherein the captured video is one of a home screen video provided by the external device and a channel video displayed when channel is changed.

7. The display device of claim 1, wherein the setting information includes a brand name of the external device, a type of the external device, and a code set of a remote control.

8. An operating method of a display device, comprising:
acquiring information about an external device;
if device information identical to the acquired information is stored in a memory of the display device, performing integrated remote control setting for the external device using setting information matching the stored device information; and
if device information identical to the acquired information is not stored in the memory, displaying a screen for the integrated remote control setting,
wherein the device information stored in memory includes a feature frame received from a server, and
the performing of the integrated remote control setting includes:
acquiring a video frame based on a video signal received from the external device, and performing the integrated remote control setting using setting information matching the feature frame when the feature frame matching the acquired video frame is stored in the memory.

9. The operating method of a display device of claim 8, wherein the information about the external device includes HDMI (High Definition Multimedia Interface) SPD (Source Product Description) information and HDMI CEC (Consumer Electronic Control) information received through the external device interface.

10. The operating method of a display device of claim 9, wherein the performing of the integrated remote control setting includes:

reading out setting information matching the stored device information if the device information identical to the information about the external device including the HDMI SPD information and the HDMI CEC information is stored in the memory, and performing the integrated remote control setting using the read-out setting information.

11. The operating method of a display device of claim 9, further comprising receiving the feature frame from the server when manually setting the integrated remote control for the external device.

12. The operating method of a display device of claim 8, wherein the performing of the integrated remote control setting includes:

capturing a video based on a video signal received from the external device when the external device is reconnected after the external device is disconnected, and performing the integrated remote control setting using setting information matching the stored video when a video matching the captured video is stored in the memory.

13. The operating method of a display device of claim 12, wherein the captured video is one of a home screen video provided by the external device and a channel video displayed when channel is changed.

* * * * *